(12) United States Patent
Someya et al.

(10) Patent No.: US 10,988,592 B2
(45) Date of Patent: Apr. 27, 2021

(54) FOAM MOLDING RESIN AND METHOD FOR MANUFACTURING FOAM MOLDED ARTICLE

(71) Applicant: KYORAKU CO., LTD., Kyoto (JP)

(72) Inventors: Takaaki Someya, Kanagawa (JP); Takeru Sano, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 46 days.

(21) Appl. No.: 15/741,870

(22) PCT Filed: Aug. 16, 2016

(86) PCT No.: PCT/JP2016/073897
§ 371 (c)(1),
(2) Date: Jan. 4, 2018

(87) PCT Pub. No.: WO2017/030116
PCT Pub. Date: Feb. 23, 2017

(65) Prior Publication Data
US 2018/0215885 A1    Aug. 2, 2018

(30) Foreign Application Priority Data

Aug. 18, 2015   (JP) ............................. JP2015-161023

(51) Int. Cl.
*C08J 9/00*         (2006.01)
*B29C 44/50*     (2006.01)
(Continued)

(52) U.S. Cl.
CPC ............. *C08J 9/0061* (2013.01); *B29B 11/10* (2013.01); *B29C 44/08* (2013.01); *B29C 44/507* (2016.11);
(Continued)

(58) Field of Classification Search
CPC .. C08J 9/0061; C08J 2423/06; C08J 2323/06; C08J 2201/03; C08J 9/122; C08J 9/04;
(Continued)

(56) References Cited

U.S. PATENT DOCUMENTS

| 4,230,831 A | * | 10/1980 | Sakurai | C08L 23/06 |
| | | | | 525/240 |
| 4,465,812 A | * | 8/1984 | Moriguchi | C08J 3/24 |
| | | | | 525/333.8 |

(Continued)

FOREIGN PATENT DOCUMENTS

| CN | 102924810 A | * | 2/2013 | ............. B29C 48/92 |
| JP | 2011-001545 A | | 1/2011 | |

(Continued)

OTHER PUBLICATIONS

"Cardoso et al., A Comparison between Chemical and Physical Process for LDPE Foams, 2011, pp. 1-2)" (Year: 2011).*

(Continued)

*Primary Examiner* — Jacob T Minskey
*Assistant Examiner* — Caroline Montiel
(74) *Attorney, Agent, or Firm* — Maier & Maier, PLLC

(57) ABSTRACT

It is an object of the present invention to provide a foam molding resin containing LDPE capable of enhancing foaming magnification. According to the present invention, there is provided a foam molding resin containing low-density polyethylene, wherein the low-density polyethylene has a melt tension of 100 to 250 mN and a shear viscosity of 350 to 450 Pa·s.

1 Claim, 4 Drawing Sheets

(51) Int. Cl.
*C08L 23/06* (2006.01)
*B29B 11/10* (2006.01)
*B29K 23/00* (2006.01)
*C08J 9/12* (2006.01)
*B29C 44/08* (2006.01)
*B29C 49/02* (2006.01)
*B29C 49/04* (2006.01)
*C08J 9/04* (2006.01)
*B29K 105/04* (2006.01)
*B29K 105/00* (2006.01)
*B29K 101/12* (2006.01)
*B29L 31/30* (2006.01)
*B29C 49/00* (2006.01)
*B29C 48/00* (2019.01)
*B29C 48/09* (2019.01)

(52) U.S. Cl.
CPC .............. *B29C 49/02* (2013.01); *B29C 49/04* (2013.01); *C08J 9/04* (2013.01); *C08J 9/122* (2013.01); *C08L 23/06* (2013.01); *B29C 48/0017* (2019.02); *B29C 48/09* (2019.02); *B29C 49/0005* (2013.01); *B29K 2023/065* (2013.01); *B29K 2023/0633* (2013.01); *B29K 2101/12* (2013.01); *B29K 2105/0058* (2013.01); *B29K 2105/04* (2013.01); *B29K 2995/0063* (2013.01); *B29L 2031/3032* (2013.01); *C08J 2201/03* (2013.01); *C08J 2203/06* (2013.01); *C08J 2207/00* (2013.01); *C08J 2323/06* (2013.01); *C08J 2423/06* (2013.01)

(58) Field of Classification Search
CPC .............. C08J 2203/06; C08J 2207/00; C09K 2200/062; B29B 11/10; B29K 2023/065; B29K 2023/0633; B29K 2101/12; B29K 2105/0058; B29K 2995/0063; B29K 2105/04; B29C 49/04; B29C 49/02; B29C 48/0017; B29C 48/0012; B29C 44/08; B29C 44/507; B29C 49/0005; B29C 48/09; C08L 2207/066; C08L 2207/062; C08L 2205/025; C08L 23/06; B29L 2031/3032

See application file for complete search history.

(56) References Cited

U.S. PATENT DOCUMENTS

| | | | | |
|---|---|---|---|---|
| 5,232,113 | A | * 8/1993 | Chen-Tsai | .......... B65D 17/4014 220/240 |
| 7,169,338 | B2 | * 1/2007 | Imanari | ............... B29C 49/0005 264/45.9 |
| 2014/0094583 | A1 | * 4/2014 | Karjala | ................. C08F 110/02 526/352.2 |
| 2016/0237232 | A1 | 8/2016 | Sano | |
| 2016/0333159 | A1 | 11/2016 | Onodera et al. | |

FOREIGN PATENT DOCUMENTS

| | | |
|---|---|---|
| JP | 2012-067256 A | 4/2012 |
| JP | 2015-096588 A | 5/2015 |
| JP | 2015-140429 A | 8/2015 |
| WO | 2015098475 A1 | 7/2015 |

OTHER PUBLICATIONS

Extended European Search Report dated May 8, 2018 of corresponding European application No. 16837105.2; 7 pgs.

* cited by examiner

FOAM MOLDING RESIN AND METHOD FOR MANUFACTURING FOAM MOLDED ARTICLE

TECHNICAL FIELD

The present invention relates to a foam molding resin and a method for manufacturing a foam molded article.

BACKGROUND ART

For example, in an air conditioner such as an automobile, a tubular air conditioning duct for ventilating air is used.

As an air conditioning duct, a foam molded article using a foam resin obtained by foaming a thermoplastic resin with a foaming agent is known. The foam molded article is expanding demand because it can realize high heat insulation and light weight at the same time.

As a method of manufacturing such a foam molded article, a blow molding method is widely known in which a molten foam resin is clamped with split molds and air is blown into the inside to expand the foam resin.

Patent Document 1 discloses a technique of increasing the melt tension (MT) to a predetermined value or more and increasing the MT×melt flow rate (MFR) to a predetermined value or more in order to increase the foaming magnification of a foam molded article in foam molding

PRIOR ART DOCUMENTS

Patent Document

Patent Document 1: JP-A-2012-067256

SUMMARY OF THE INVENTION

Problems to be Solved by the Invention

The criteria disclosed in Patent Document 1 is applicable to various raw material resins. However, when investigation is conducted on how MT and MT×MFR is related to foaming magnification of a foam molded article with respect to low-density polyethylene (LDPE) used for raw material resin for foam molding, it has been found that there is a case that foaming magnification is low despite that the MT and MT×MFR are both relatively high.

The present invention has been made in view of the above circumstances, and it is an object of the present invention to provide a foam molding resin containing LDPE capable of enhancing foaming magnification.

Means for Solving the Problems

According to the present invention, there is provided a foam molding resin (resin for foam molding) containing low-density polyethylene, wherein the low-density polyethylene has a melt tension of 100 to 250 mN and a shear viscosity of 350 to 450 Pa·s.

As a result of intensive studies, the inventors of the present invention have found that when the MT of LDPE is within a predetermined range and the shear viscosity of LDPE is within a predetermined range, it is possible to obtain a foam molded article having a high foaming magnification, and thus completed the present invention.

In the present invention, attention is paid to shear viscosity as a parameter of viscosity relating to foam molding property. Unlike MFR related to the moldability of foam parison after being extruded from die head, shear viscosity is a viscosity parameter related to absorption behavior of gas into resin within a foam extruder. When the shear viscosity is within the predetermined range, dissolution and dispersion of the gas in the resin become preferable, thereby improving the foam molding property.

Hereinafter, various embodiments of the present invention will be exemplified. The following embodiments can be combined with each other.

Preferably, the foam molding resin further contains high-density polyethylene.

Preferably, the mass ratio of the low-density polyethylene and the high-density polyethylene is 2:8 to 8:2.

According to another aspect of the present invention, there is provided a method of manufacturing a foam molded article, comprising the steps of:

forming a foam parison by extruding, from a foam extruder, a melt-kneaded resin obtained by melt-kneading the above-mentioned foam molding resin and a foaming agent in the foam extruder;

molding the foam parison to obtain the foam molded article.

EMBODIMENTS

Figure 1:
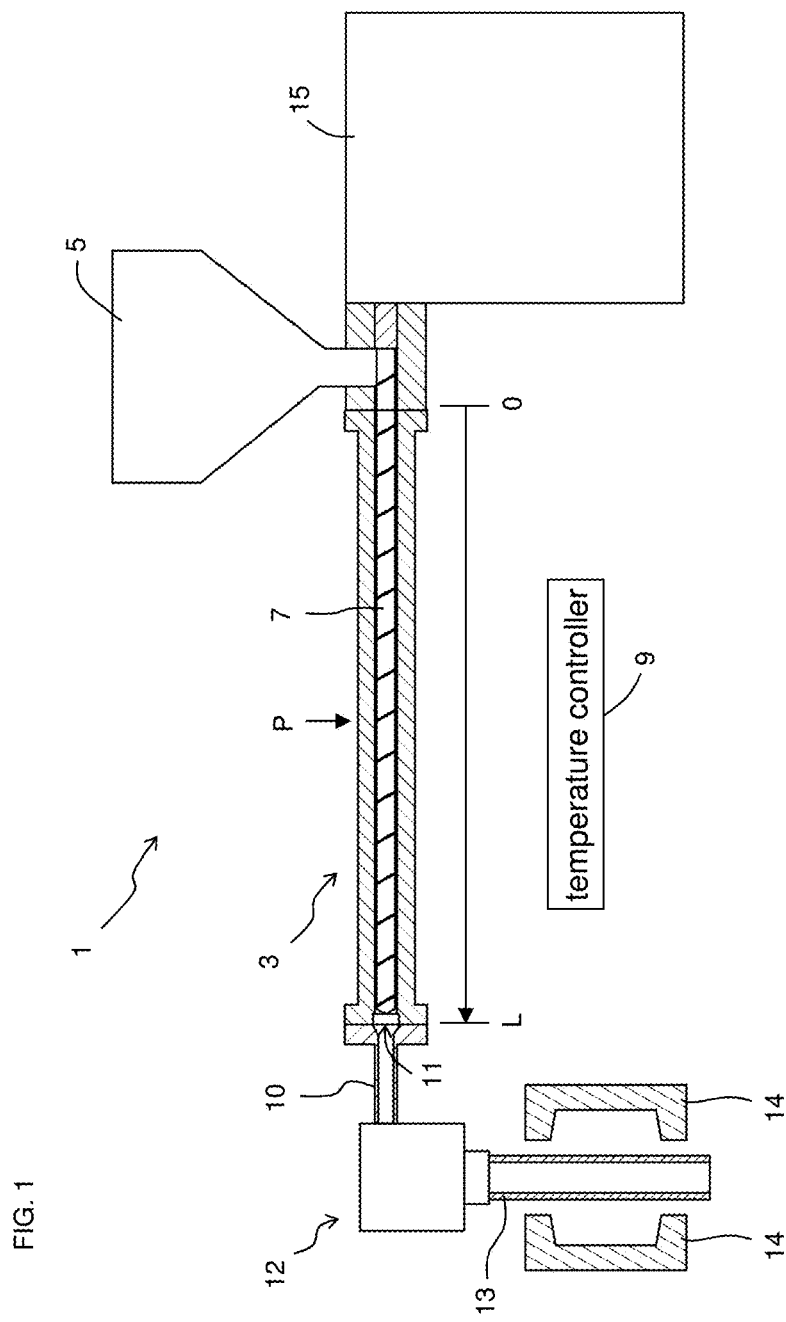
FIG. 1 is a cross-sectional view showing a foam extruder 1 and split molds 14 according to one embodiment of the present invention.

Hereinafter, embodiments of the present invention will be described. The various features shown in the embodiments described below can be combined with each other. Also, the invention is independently established for each feature item.

1. Foam Molding Resin

A foam molding resin of an embodiment of the present invention is a foam molding resin containing LDPE, wherein the LDPE has an MT of 100 to 250 mN and a shear viscosity of 350 to 450 Pa·s.

As shown in Examples and Comparative Examples described later, foaming magnification of a foam molded article can be enhanced by performing foam molding using a raw material resin containing LDPE having MT and shear viscosity within the above range. Even when raw material resin contains resin other than LDPE, physical properties of LDPE are particularly important. Because the resin having long chain branching like LDPE has a role of entangling molecular chains with each other and keeping the cell structure between bubbles, the physical properties of LDPE having long chain branching strongly influence the quality of foam molding properties.

In the present embodiment, the MT of the LDPE is 100 to 250 mN. When the MT of LDPE is less than 100 mN, foaming magnification decreases because the resin strength is too low to cause breakage and generate pinholes. On the other hand, when the MT of LDPE exceeds 250 mN, since the resin strength is too high, the growth of bubbles is inhibited and the foaming magnification decreases. MT is preferably 100 to 200 mN. In this case, the foaming magnification tends to be even higher. In the present specification, "melt tention (MT)" means a value obtained by the following conditions. The MT is measured by the following method using a melt tention tester (manufactured by Toyo Seiki Seisaku-sho, Ltd.). A strand is extruded from an orifice having a diameter of 2.095 mm and a length of 8 mm at a test temperature of 190° C. and an extrusion rate of 10 mm/min. MT is a tension of the strand when the strand is would around a roller having a diameter of 80 mm at a speed of 16 rpm.

In the present embodiment, the shear viscosity of LDPE is 350 to 450 Pa·s. When the shear viscosity of LDPE is less than 350 Pa·s, the resin pressure in the foam extruder which kneads foam molding resin and foaming agent is too low, and thus foaming gas is not sufficiently dissolved in the foam molding resin, and foaming magnification becomes low. On the other hand, when the shear viscosity of the LDPE exceeds 450 Pa·s, the difference between the resin pressure and the gas injection pressure in the foam extruder which kneads the foam molding resin and the foaming agent becomes small, and thus the resin is hardly compatible with the gas, and the dispersibility of the gas becomes low and foaming magnification becomes low. The shear viscosity is preferably 350 to 400 Pa·s. In this case, the foaming magnification tends to be even higher. In the present specification, "shear viscosity" means a value obtained by conducting measurement at a test temperature of 190° C. at an apparent shear rate of 600/second according to JIS K-7199.

The MFR of the LDPE of the present embodiment is not particularly limited, but is preferably 0.2 to 2.5 g/10 min, more preferably 0.8 to 2.0 g/10 min. In this case, foaming magnification tends to be particularly high. In the present specification, "Melt flow rate (MFR)" means a value obtained by conducting measurement at a test temperature of 190° C. under a test load of 2.16 kg in accordance with JIS K-7210.

The foam molding resin of the present embodiment may be composed only of LDPE or may contain another resin. As a resin other than LDPE, high-density polyethylene (HDPE) can be mentioned. The inclusion of HDPE in the foam molding resin increases the rigidity of the resulting foam molded article. The mass ratio of LDPE and HDPE is not particularly limited but is preferably 2:8 to 8:2, more preferably 3:7 to 7:3. If the proportion of HDPE is too small, the rigidity of the foam molded article tends to be low, and if the proportion of HDPE is too large, the foaming magnification tends to be low. A foam molded article with high rigidity and foaming magnification can be obtained by using a resin in which LDPE and HDPE are mixed at the above ratio.

The physical properties of HDPE are not particularly limited, but preferable MFR, shear viscosity, density and MT are as follows. When HDPE having the following physical properties is used in combination with LDPE, a foam molded article with high rigidity and foaming magnification can be easily obtained.
MFR: 0.2 to 0.4 g/10 min
Shear viscosity: 550 to 650 Pa·s
Density: 0.94 to 0.96 g/cm$^3$
MT: 70 to 200 mN The length of the bubble in the thickness direction in the foam molded article is preferably from 50 to 100 μm. In the case of 50 μm, foaming magnification tends to be small because bubble growth is insufficient, and in the case of more than 100 μm breakage occurs and pinholes tend to occur.

2. Method of Manufacturing Foam Molded Article

A method of manufacturing a foam molded article according to an embodiment of the present invention, comprising the steps of:

forming a foam parison by extruding, from a foam extruder, a melt-kneaded resin obtained by melt-kneading the foam molding resin of any one of Claims 1 to 3 and a foaming agent in the foam extruder;

molding the foam parison to obtain the foam molded article.

This method, in one example, can be carried out using a foam extruder 1 and split molds 14 shown in FIG. 1. The foam extruder 1 includes a cylinder 3, a resin inlet 5, a screw 7, a foaming agent inlet P, a temperature controller 9, a resin extrusion port 11, and a die head 12.

Each component will be described in detail below.

<Resin Inlet 5>

The resin inlet 5 is a so-called hopper, from which a raw material resin is introduced. The form of the raw material resin is not particularly limited, but usually it is pellet form. The raw material resin is the foam molding resin of one embodiment of the present invention described above. The raw material resin is injected into the cylinder 3 from the resin inlet 5 and then melted by being heated in the cylinder 3 to become a molten resin. Further, by rotation of the screw 7 arranged in the cylinder 3, it is conveyed toward the resin extrusion port 11 provided at one end of the cylinder 3.

<Screw 7>

The screw 7 is disposed in the cylinder 3, and conveys it toward the resin extrusion port 11 while kneading the molten resin by its rotation. A gear arrangement 15 is provided at one end of the screw 7, and the screw arrangement 7 is rotationally driven by the gear arrangement 15. The number of the screws 7 arranged in the cylinder 3 may be one or two or more.

<Foaming Agent Inlet P>

The cylinder 3 is provided with a foaming agent inlet P for injecting a foaming agent into the cylinder 3. The position where the foaming agent inlet P is provided is not particularly limited, but the position of the foaming agent inlet P is preferably 0.3 L to 0.7 L (more preferably 0.4 to 0.6 L) where the positions of the ends of the cylinder 3 on the side of the resin inlet 5 and on the side of the resin extrusion port 11 are defined to be 0 and L, respectively. If the foaming agent inlet P is provided on the side of the resin inlet 5 than the position of 0.3 L, the foaming agent may be injected into molten resin which is insufficiently kneaded, resulting in insufficient dispersion of the foaming agent. Further, since the temperature of the molten resin is usually controlled so as to gradually decrease toward the resin extrusion port 11, if the foaming agent inlet P is provided on the side of the resin extrusion port 11 than the position of 0.7 L, the temperature of the resin at the site to which the foaming agent is injected may be too low and the injection amount of foaming agent may decrease.

The foaming agent injected from the foaming agent inlet P includes a physical foaming agent, a chemical foaming agent, and mixtures thereof, but a physical foaming agent is preferred. As a physical foaming agent, an inorganic physical foaming agent such as air, carbon dioxide gas, nitrogen gas, water and the like, and an organic physical foaming agent such as butane, pentane, hexane, dichloromethane, dichloroethane, and their supercritical fluids can be used. As the supercritical fluid, it is preferable to use carbon dioxide, nitrogen or the like. Supercritical fluids can be obtained by setting, in the case of nitrogen, the temperature to a value above the critical temperature of −149.1° C. and the pressure to a value above the critical pressure of 3.4 MPa, and by setting, in the case of carbon dioxide, the temperature to a value above the critical temperature of 31° C. and the pressure to a value above the critical pressure of 7.4 MPa. As a chemical foaming agent, one which generates carbon dioxide by a chemical reaction between an acid (e.g., citric acid or a salt thereof) and a base (e.g., sodium bicarbonate) can be mentioned. Instead of injecting from the foaming agent inlet P, the chemical foaming agent may be injected from the resin inlet 5.

<Temperature Controller 9>

The temperature controller 9 is configured to individually control a plurality of temperature control units provided along the cylinder 3 to control the temperature of each part of the cylinder 3. The temperature controller 9 can also control the temperature of the die head 12 for forming the parison and the temperature of the connecting part 10 between the cylinder 3 and the die head 12.

<Resin Extrusion Port 11•Die Head 12>

Figure 2:
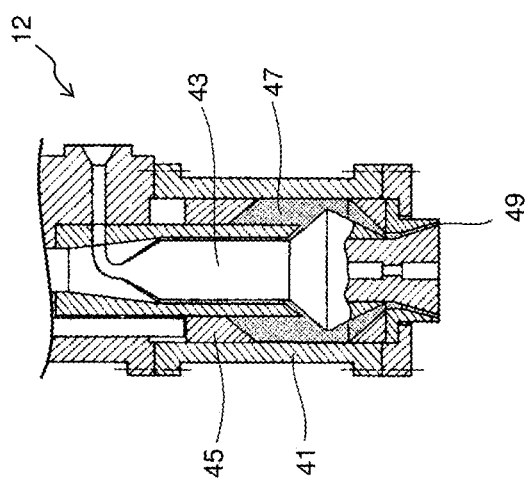
FIG. 2 is a cross-sectional view showing a detailed configuration of the die head 12 in FIG. 1.

The melt-kneaded resin obtained by melt-kneading raw material resin and foaming agent is extruded from resin extrusion port 11 and injected into die head 12 through connecting part 10. As shown in FIG. 2, the die head 12 has a cylindrical die outer cylinder 41 and a mandrel 43 accommodated therein, and stores melt-kneaded resin extruded from the cylinder 3 in a space 47 therebetween. Then, after a predetermined amount of melt-kneaded resin is stored in the space 47, the melt-kneaded resin is pushed downward from the die slit 49 by pushing down the ring piston 45 in the vertical direction to form a cylindrical foam parison 13. Here, the die head 12 for forming the cylindrical foam parison 13 is shown, but the die head 12 may be for forming a sheet-shaped foam parison.

<Split Molds 14>

The foam parison 13 is disposed between a pair of split molds 14. A foam molded article can be obtained by molding foam parison 13 using the split molds 14. The method of molding using the split molds 14 is not particularly limited and may be blow molding in which air is blown into the cavity of the split molds 14 to perform molding, may be vacuum molding in which the interior of the cavity of the split molds 14 is depressurized to mold foam parison 13, or a combination thereof.

EXAMPLES

Experimental Example 1

Using the foam extruder 1 and the split molds 14 shown in FIG. 1, a foam molded article was prepared and the foam molding property was evaluated. The inner diameter of the cylinder 3 of the foam extruder 1 was 50 mm, and L/D=34. For raw material resin, LDPE shown in Table 1 and HDPE (grade: B470, manufactured by Asahi Kasei Chemicals Corporation) mixed at a mass ratio of 1:1 were used. The temperature controller 9 was set so that the temperature of the foam parison 13 was 190 to 200° C. The rotation number of the screw 7 was 60 rpm, and the extrusion amount was 20 kg/hr. $N_2$ gas was used as the foaming agent, and it was injected from the foaming agent inlet P located at the 0.5 L position. Adjustment of foaming magnification was carried out by changing the amount of injected gas.

Blow molding was carried out using a foam parison formed under the above conditions to prepare a cylindrical foam molded article having a diameter of 50 mm, a height of 100 mm and a thickness of 5 mm.

For each raw material resin, several types of foam molded articles with different amounts of injected gas were prepared. Foaming magnification of the foam molded articles without pinholes and foam breaks and having maximum foaming magnification is determined to be a moldable foaming magnification. In the following description, moldable foaming magnification is simply referred to as foaming magnification.

The obtained results are shown in Table 1. Samples A to D in Table 1 are Examples of the present invention and Samples E to L are Comparative Examples. In Table 1, the values of MT, MFR, MT×MFR, and shear viscosity are shown together. MT, MFR, and shear viscosity were measured by the method described in the section of "EMBODIMENTS".

TABLE 1

| Sample | LDPE Grade | LDPE Manufacturing company | MT [mN] | MFR [g/10 min] | MT × MFR [mN · g/10 min] | Shear viscosity [Pa · s] | Moldable foaming magnification [magnification] |
|---|---|---|---|---|---|---|---|
| A | PE015 | Repsol | 130.3 | 0.81 | 105 | 428 | 2.0 |
| B | D2024 | PTT chemical | 228.6 | 0.24 | 55 | 423 | 2.4 |
| C | LD103 | exxonmobil | 132.9 | 0.99 | 132 | 385 | 3.2 |
| D | M1820 | Asahi Kasei Chemicals | 192.5 | 1.79 | 345 | 368 | 3.2 |
| E | PE033 | Repsol | 284.9 | 0.21 | 60 | 541 | 1.9 |
| F | FC39 | Polimeri europa | 195.4 | 0.28 | 55 | 546 | 1.9 |
| G | HP0323N | sabic | 200.9 | 0.28 | 56 | 496 | 1.6 |
| H | 1020FA20 | Reliance | 121.2 | 1.77 | 215 | 320 | 1.5 |
| I | 1122B | Chevron Phillips | 72 | 2.2 | 158 | 369 | 1.7 |
| J | CP763 | schulman | 53.2 | 1.87 | 99 | 360 | 1.7 |
| K | LDF201FG | Lotte chemical | 30.2 | 3.32 | 100 | 298 | 1.6 |
| L | FB0300 | LG Chem | 255.7 | 0.3 | 77 | 514 | 1.5 |

Figure 3:
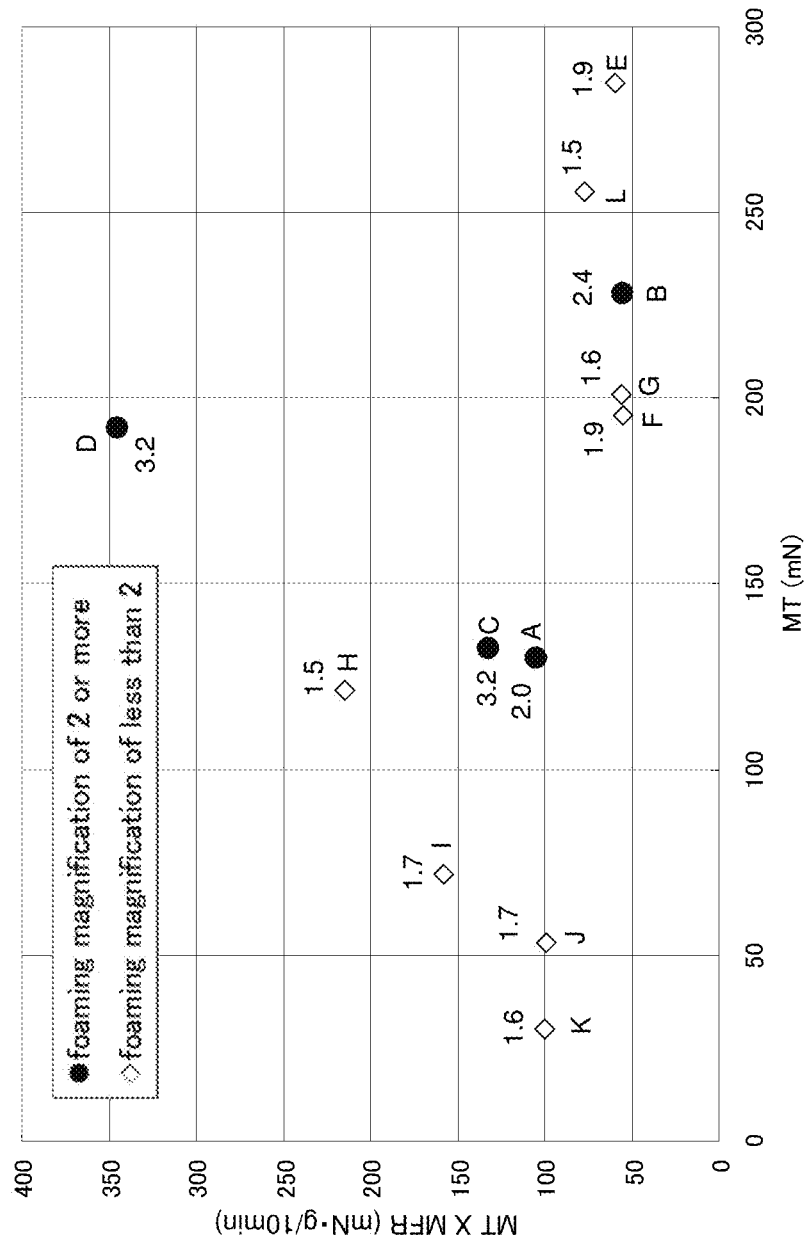
FIG. 3 is a graph plotting the relationship between MT and MT×MFR for Samples A to L of Experimental Example 1 of the present invention.
Figure 4:
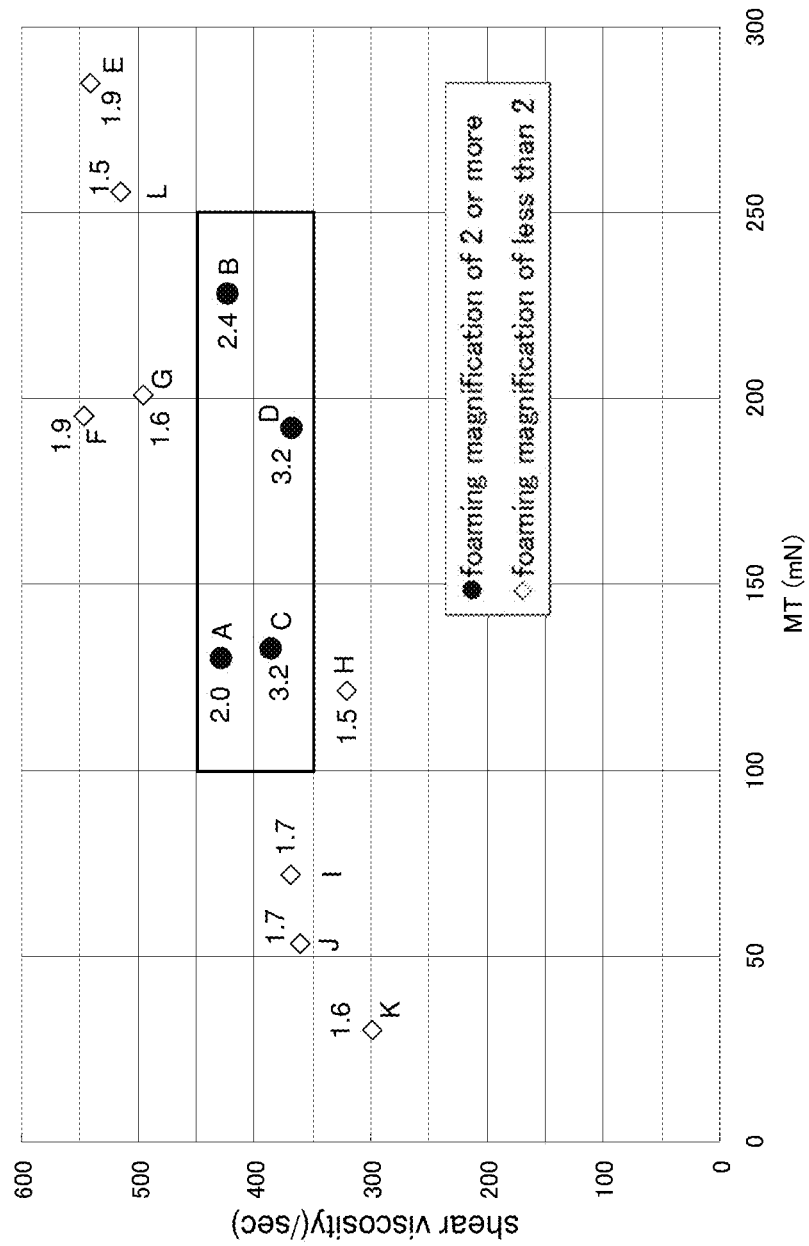
FIG. 4 is a graph plotting the relationship between MT and shear viscosity for Samples A to L of Experimental Example 1 of the present invention.

For Samples A to L in Table 1, the relationship between MT and MT×MFT is plotted in FIG. 3 and the relationship between MT and shear viscosity is plotted in FIG. 4. In FIG. 3 to FIG. 4, those having a foaming magnification of 2 times or more are indicated by black circles, and those having a foaming magnification of less than 2 times are shown with a white diamond shape. The numerical values described at positions adjacent to each plotted point indicate foaming magnification.

As can be seen from the comparison of Sample A, C, H in FIG. 3, it was found that the foaming magnification may not always be high even when MT×MFR is high. On the other hand, as shown in FIG. 4, it can be seen that Sample having a foaming magnification of 2 or more gathered in a region surrounded by a rectangle with a thick line in FIG. 4. The area enclosed by the rectangle corresponds to MT of 100 to 250 mN and shear viscosity of 350 to 450 Pa·s. This indicates that foaming magnification can be enhanced by using, as raw material, the resin containing LDPE whose MT and shear viscosity are within such ranges. Furthermore, it was found that the foaming magnification is further increased when the shear viscosity is 350 to 400 Pa·s.

Experimental Example 2

In Example 2, the same LDPE as Sample D was used, Sample D1 in which the mass ratio of LDPE and HDPE was changed to 7:3, and Sample D2 in which the mass ratio of LDPE and HDPE was changed to 3:7 were made. Formable foaming magnification was measured. As a result, the moldable foaming magnification was 4 for Sample D1 and 2.3 for Sample D2. This result indicates that even if the mass ratio of LDPE and HDPE is not 1:1, foaming magnification of the foam molded article can be enhanced by using LDPE having MT of 100 to 250 mN and shear viscosity of 350 to 450 Pa·s.

EXPLANATION OF REFERENCE NUMERALS

1: foam extruder, 3: cylinder, 5: resin inlet, 7: screw, 9: temperature control unit, 11: resin extrusion port, 12: die head, 13: foam parison, 14: split mold, P: foaming agent inlet

The invention claimed is:

1. A method of manufacturing a foam molded article, comprising the steps of:
   forming a foam parison by extruding, from a foam extruder, a melt-kneaded resin obtained by melt-kneading a foam molding resin and a foaming agent in the foam extruder, the foam molding resin having a melt tension of 192.5 mN and a shear viscosity of 368 Pa s, the shear viscosity being measured at a test temperature of 190 degrees Celsius at an apparent shear rate of 600/second according to JIS K 7199;
   blow or vacuum molding the foam parison to obtain the foam molded article using split molds, wherein
   the foam molding resin contains low-density polyethylene and high-density polyethylene in a mass ratio of 7:3; and
   the foam extruder comprises a cylinder, a resin inlet, a foaming agent inlet, and a resin extrusion port,
   the foam molding resin is injected into the cylinder via the resin inlet,
   the foaming agent is injected into the cylinder via the foaming agent inlet,
   the melt-kneaded resin is extruded from the resin extrusion port, and
   a position of the foaming agent inlet is 0.3 L to 0.7 L where positions of ends of the cylinder on a side of the resin inlet and on a side of the resin extrusion port are defined to be 0 and L.

* * * * *